(Model.)

2 Sheets—Sheet 1.

A. J. NELSON.
CORN DROPPER.

No. 245,089. Patented Aug. 2, 1881.

Witnesses:

Inventor:
Andrew J. Nelson
by his Atty. E. N. Gleaso (Model.)

2 Sheets—Sheet 2.

A. J. NELSON.
CORN DROPPER.

No. 245,089.

Patented Aug. 2, 1881.

UNITED STATES PATENT OFFICE.

ANDREW J. NELSON, OF MOLINE, ILLINOIS.

CORN-DROPPER.

SPECIFICATION forming part of Letters Patent No. 245,089, dated August 2, 1881.

Application filed May 3, 1881. (Model.)

*To all whom it may concern:*

Be it known that I, ANDREW J. NELSON, a citizen of the United States, residing at Moline, in the county of Rock Island and State of Illinois, have invented certain new and useful Improvements in Corn-Droppers; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in mechanism of corn-droppers for operating the seed-slide, to obviate the use of knotted rope or wire, and also to prevent the seed from waste when turning or commencing new rows, and to enable the dropping to be done automatically and regularly.

It consists in connecting the seed-slide with a rock-lever which is operated by a cam on a wheel revolved by a wire rope or cord encircling the wheel. I attain these objects by the mechanism illustrated in the accompanying drawings, in which—

Figure 1:
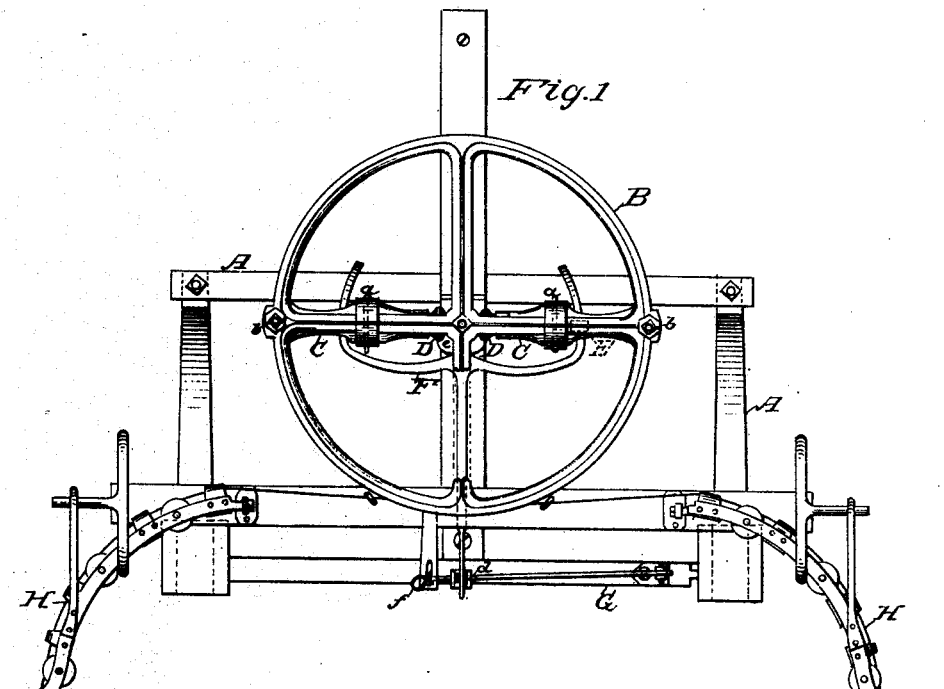
Figure 2:
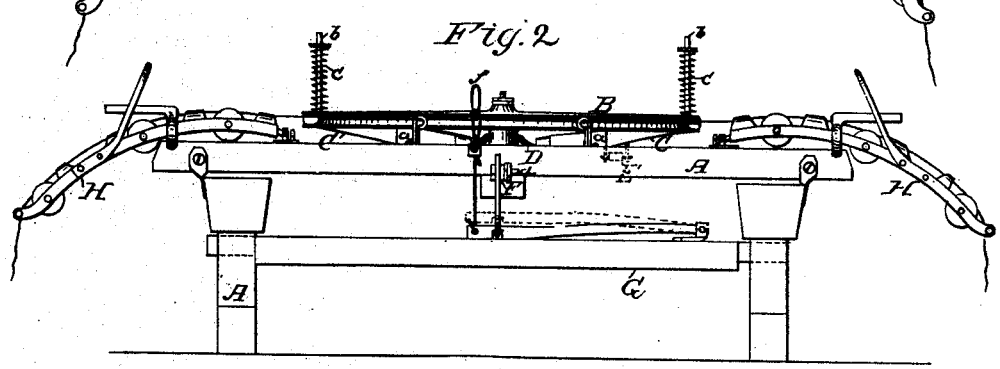
Figure 3:
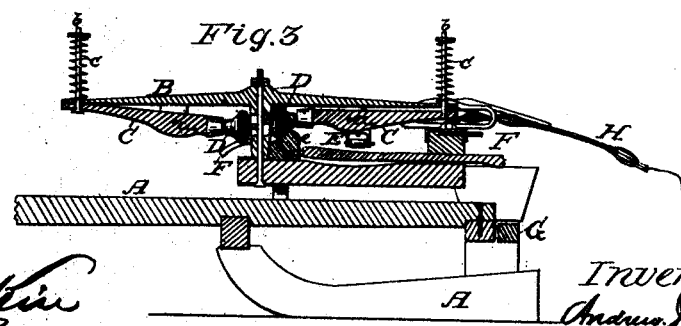
Figure 4:
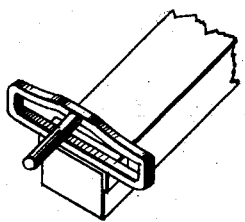
Figure 5:
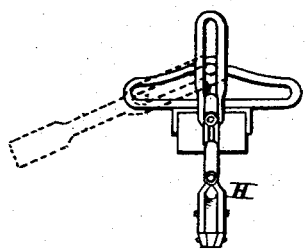
Figure 6:
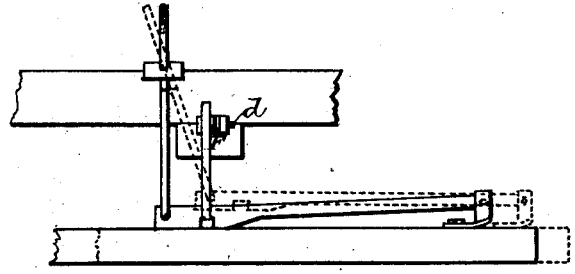

Figure 1 is a top view of my improvements as applied to a planter. Fig. 2 is a rear view of the planter. Fig. 3 is a longitudinal section of the wheel and reversible or self-acting pulley with rope connection. Fig. 4 is a perspective of the projection upon which the self-acting pulley turns, and the loop which acts as a guide. Fig. 5 is an end view of the pulley and its attachments. Fig. 6 is an enlarged detail view of the attachment to the seed-slide.

Similar letters of reference indicate and refer to corresponding parts.

A represents the frame of a corn-planter, supported on sled-runners in the usual manner.

B represents the wheel, having a groove on the outer rim, in which runs the rope. The wheel is held in place by a pin or bolt passing through shaft and attached to the planter, with a screw-nut on its upper part, by which the easy and even working of the wheel may be regulated.

C C represent levers or movable bars, which are attached to the cross-sections of wheel B, at about one-fourth the space from the outer rim, and held by pins or bolts at *a a*, so as to work easy. One end of these levers extends to the outer rim of wheel B, and through the ends is fixed a rod or bolt, *b b*, which passes up through the rim of the wheel and is attached to and held by the springs *c c*.

Connected with the inner end of the levers C C are the beveled wheels D D, which are attached by pivot to the shaft of wheel B, and socketed to and working in and with the levers C C.

E is a cam-roller fitted and attached to the under side of one of the levers C C, which impinges on the rock-lever F twice on each revolution of wheel B, producing a rocking motion on the lever F, that is attached by arms to the inner end, formed in a sort of half-circle, bent at the ends, reaching out and directly under the cam-roller E. This end of lever F is fitted to work in a box or socket at or near the shaft of wheel B. The outer end of lever F is bent downward and connects to and with the seed-slide lever G, and is arranged with a bolt or pin, *d*, and a screw-nut in such manner as to regulate the stroke of the feed-slide. The lever G is attached at one end to the feed-slide. In the other end is made a slot that locks on the pin *d*, and to the end is connected a ratchet-rod, *f*, for the purpose of lifting up the lever to disconnect the operating of the feed-slide when passing over planted ground or when turning to begin new rows.

H H are reversible or self-acting pulleys, provided with friction-rollers and placed at each end of center bar, through which the rope passes after encircling the wheel B. On turning, each pulley works automatically, placing itself in position. On the inner side of the shaft of wheel B, as shown at *e*, is placed a raised half disk or elevation, on which impinges the rollers D D twice on each revolution of wheel B. By this operation the levers C C are opened and shut at the rim of the wheel, thereby tightly clasping the rope at one side, while the other is open to receive the rope where it crosses at the opposite side, serving to keep the rope tight and prevent slipping. When in operation the rope causes the revolution of wheel B and brings in play levers C C, the beveled wheels D D, the cam-roller E, with rock-lever F, and the slide-lever G, all working together in combination to effect the purpose desired.

Having thus described my invention, what

I claim as new, and desire to secure by Letters Patent, is—

1. The combination of the wheel B, the levers C, pivoted thereto and provided with the rollers D, the levers being connected to the wheel at their outer ends by means of springs, substantially as shown.

2. The combination of the wheel B, the levers C, pivoted thereto, provided with the rollers D and actuated at their outer ends by means of springs, with the cams $e$ and rocking lever F, substantially as described.

3. The self-adjusting pulley H, pivoted upon the top of the frame at its inner end and passing through a guiding-loop on the frame, and provided with a loop to catch over a projection upon the top of the guiding-loop, substantially as shown.

In testimony whereof I affix my signature in presence of two witnesses.

ANDREW J. NELSON.

Witnesses:
W. J. ENTRIKIN,
G. D. MATHEWSON.